(12) United States Patent
Yanagawa et al.

(10) Patent No.: US 6,577,565 B1
(45) Date of Patent: Jun. 10, 2003

(54) OPTICAL PICKUP FOR PERFORMING RECORDING OR READING OPERATION ON RECORDING MEDIUM HAVING PREPITS

(75) Inventors: Naoharu Yanagawa, Tokorozawa (JP); Masayoshi Yoshida, Tokorozawa (JP); Yoshitaka Shimoda, Tokorozawa (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/348,124

(22) Filed: Jul. 2, 1999

(30) Foreign Application Priority Data

Jul. 7, 1998 (JP) .......................................... 10-191222

(51) Int. Cl.$^7$ ............................................. G11B 7/095
(52) U.S. Cl. ................................ 369/44.23; 369/53.22; 369/53.31; 369/112.17; 369/112.28
(58) Field of Search ........................... 369/44.23, 53.22, 369/53.31, 112.05, 112.16, 112.17, 112.28, 124.07, 124.12

(56) References Cited

U.S. PATENT DOCUMENTS

| 5,097,463 | A | * | 3/1992 | Wagenblast et al. |
| 5,132,953 | A | * | 7/1992 | Matsubayashi |
| 5,523,994 | A | * | 6/1996 | Ando et al. |
| 6,058,093 | A | * | 5/2000 | Kato et al. |

* cited by examiner

Primary Examiner—W. R. Young
(74) Attorney, Agent, or Firm—Ladas & Parry

(57) ABSTRACT

An optical pickup for reading information from a recording medium having a plurality of prepits or for recording information onto the recording medium is provided. The optical pickup includes: a light emitting device for emitting a light beam to the recording medium; a dividing device for dividing the light beam reflected by the recording medium into a first divided beam and a second divided beam; an astigmatism producing device for producing astigmatism in the first divided beam; a first light receiving device for receiving the first divided beam from the astigmatism producing device; and a second light receiving device for receiving the second divided beam from the dividing device.

10 Claims, 5 Drawing Sheets

OPTICAL PICKUP FOR PERFORMING RECORDING OR READING OPERATION ON RECORDING MEDIUM HAVING PREPITS

BACKGROUND OF THE INVENTION

1. Field of the Invention

The present invention relates to an optical pickup for achieving recording/reproduction of information in such an information recording medium as DVD and for detecting prepits which are preliminarily recorded on the information recording medium and which indicate various control information such as address information.

2. Description of the Related Art

Recently, in an information recording medium in which information can be additionally written, such as DVD-R (DVD-Recordable), a plurality of prepits indicating various control information such as address information are preliminarily formed on the information recording medium at preformat stage. When recording or reproduction is carried out with respect to the information recording medium, necessary control information is obtained by detecting the prepits. The prepits are generally formed as phase pits in a land track of the information recording medium. The detection of the prepits is carried out with a light receiving device installed in an optical pickup which is usually used for reproduction of information pits. That is, both the detection of the prepits and the detection of the information pits are simultaneously carried out with the single light receiving device.

To realize a focusing servo control, astigmatic method is used. The astigmatic method is a method of detecting a focus error by positively using astigmatism. To produce astigmatism in a light beam, a multilens or a cylindrical lens is used as the optical system in the optical pickup. In such an optical pickup, the light beam is passed through the multilens or the cylindrical lens and then is entered the light receiving device. The light receiving device thus generates a detection signal corresponding to the received light beam. This detection signal is utilized for generation of an RF (Radio Frequency) signal, detection of a tracking error, detection of the prepits, and other various operations as well as detection of the focus error.

However, producing astigmatism in the light beam causes deflection of the light beam. This causes the following problem. In a typical optical pickup, the light receiving device has a light receiving portion that is divided into a plurality of regions, for example, four regions. The optical pickup simultaneously receives the light beam with the respective divided regions, generates a push-pull signal, and outputs this signal as the detection signal. If the deflection occurs in the light beam by producing astigmatism, a light receiving pattern is deflected to one way. This causes the inaccuracy of the detection of the prepits. Further, if astigmatism produced by the multilens mixes with astigmatism produced by other optical systems, various undesirable phenomena occur in the light receiving pattern, for example, rotation of the light receiving pattern, appearance of oblique astigmatism.

SUMMARY OF THE INVENTION

It is therefore an object of the present invention to provide an optical pickup which can accurately detects prepits with a simple structure, using an optical device for producing astigmatism in a light beam.

An optical pickup in accordance with the present invention is a device for reading information from a recording medium having a plurality of prepits or a device for recording information onto the recording medium. The optical pickup includes: a light emitting device for emitting a light beam to the recording medium; a dividing device for dividing the light beam reflected by the recording medium into a first divided beam and a second divided beam; an astigmatism producing device for producing astigmatism in the first divided beam; a first light receiving device for receiving the first divided beam from the astigmatism producing device; and a second light receiving device for receiving the second divided beam from the dividing device.

In the optical pickup according to the present invention, the light beam reflected by the recording medium is divided into two light beams, namely, the first divided beam and the second divided beam. The light beam reflected by the recording medium contains various information, for example, information of prepits and information to be used for focus error detection. Both the first divided beam and the second divided beam contain these information. The first divided beam is supplied to the astigmatism producing device. The astigmatism producing device produces astigmatism in the first divided beam. The first divided beam is then supplied from the astigmatism producing device to the first light receiving device.

On the other hand, the second divided beam is supplied to the second light receiving device. Because the second divided beam is not supplied to the astigmatism producing device, the astigmatism is not produced in the second divided beam by the astigmatism producing device.

The first divided beam received by the first light receiving device is used for focus error detection for example. As the astigmatism has been produced in the first divided beam, the focus error detection can be appropriately carried out.

On the other hand, the second divided beam received by the second light receiving device is used for prepit detection. Because the astigmatism is not produced in the second divided beam by the astigmatism producing device, deflection of the light receiving pattern of the second divided beam on the second light receiving device can be reduced or removed. Therefore, the accuracy of the prepit detection can be increased.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Figure 1A:
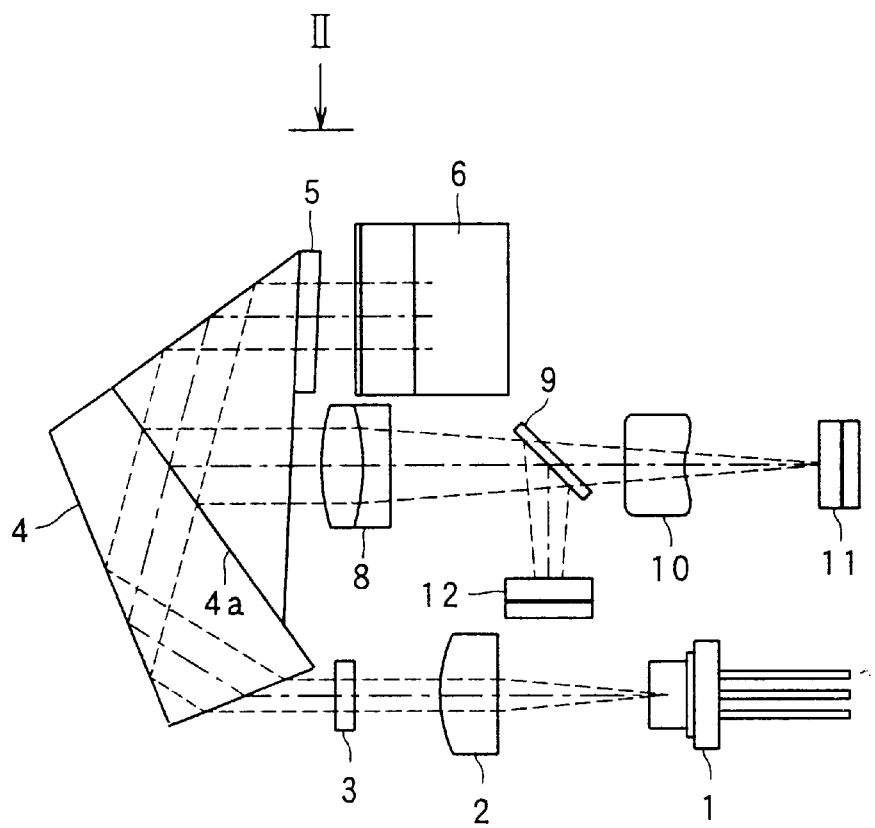
FIG. 1A is a schematic structure diagram of an optical pickup according to an embodiment of the present invention.

FIG. 1A shows a schematic structure of an optical pickup according to the embodiment of the present invention. The optical pickup shown in FIG. 1A comprises a semiconductor laser 1 or a light source, a collimator lens 2, a grating 3, a prism 4, a ¼ wavelength plate 5, a reflecting prism 6, an objective lens 7, a condenser lens 8, a half mirror 9, a multilens 10, a first photo receiver 11 and a second photo receiver 12.

Referring to FIG. 1A, a light beam emitted from the semiconductor laser 1 passes through the collimator lens 2 so that it is converted to a collimated light beam. The collimated light beam is diffracted by the grating 3 so that it is separated to a main beam and two auxiliary beams for tracking servo control.

The light beams passing through the grating 3 impinge upon the prism 4, pass a reflecting film 4a and are introduced to the ¼ wavelength plate 5. This reflecting film 4a allows, for example, 100% of P polarization light beams to pass and reflects 100% of S polarization light beams. Therefore, if the P polarization light beam is used as the light beam emitted from the semiconductor laser 1 and the light beam reflected by an information recording surface of an optical disk 13 is converted into the S polarization light beam, optical paths of the emission side and the receiving side can be separated preferably.

Figure 1B:
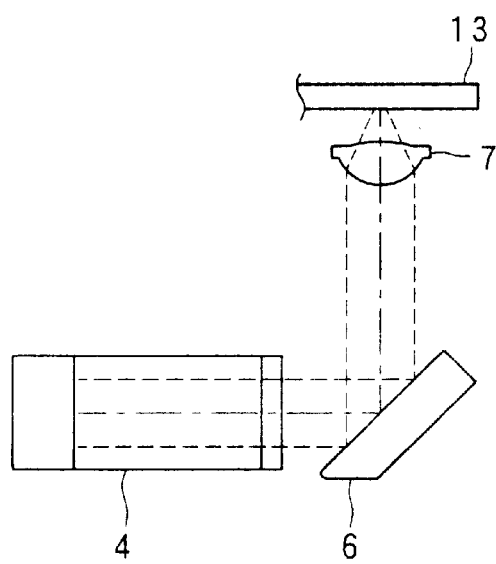
FIG. 1B is a view of a part of the optical pickup as being taken in the direction of the arrow II of FIG. 1A.

The light beams passing through the reflecting film 4a are reflected vertically relative to paper surface of FIG. 1A by the reflecting prism 6 through the 1/4 wavelength plate 5. FIG. 1B is a side view of the prism 4, the reflecting prism 6 and the like as viewed in a direction of an arrow II. This figure indicates that the light beams are reflected substantially at right angle by the reflecting prism 6. After that, the light beams are introduced by the objective lens 7 and focused on the information recording surface of the optical disk 13 so as to form light spots.

The light beams reflected by the information recording surface of the optical disk 13 pass through the objective lens 7 again and are reflected by the reflecting prism 6. After that, the beams are converted to the S polarization light beams by turning a polarization surface by the 1/4 wavelength plate 5 and introduced to the prism 4. Then, they are reflected by the reflecting film 4a of the prism 4 and introduced to the half mirror 9 through the condenser lens 8.

As shown in FIG. 1, the half mirror 9 divides the light beams to two directions. The light beams passing through the half mirror 9 are introduced to the first photo receiver 11 through the multilens 10. The light beams reflected by the half mirror 9 are introduced to the second photo receiver 12.

A non-polarization beam splitter is used as the half mirror 9. The non-polarization beam splitter allows to pass and reflects the light beams without depending on polarization of the light beams. This prevents a generation of defocus due to disturbance of light beam intensity distribution, which is caused by a polarization phase difference resulting from double refraction of a substrate of the optical disk 13. In addition, the device for dividing the light beams to two directions is not. limited to the non-polarization beam splitter. Other device which provides a function of dividing the light beams to two directions may be used.

The multilens 10 has functions as a cylindrical lens and convex lens and is capable of producing astigmatism in the light beams. The multilens 10 may be replaced with other optical device capable of generating astigmatism, such as a general cylindrical lens, a hologram device in which a hologram pattern providing with astigmatism is formed.

Figure 1C:
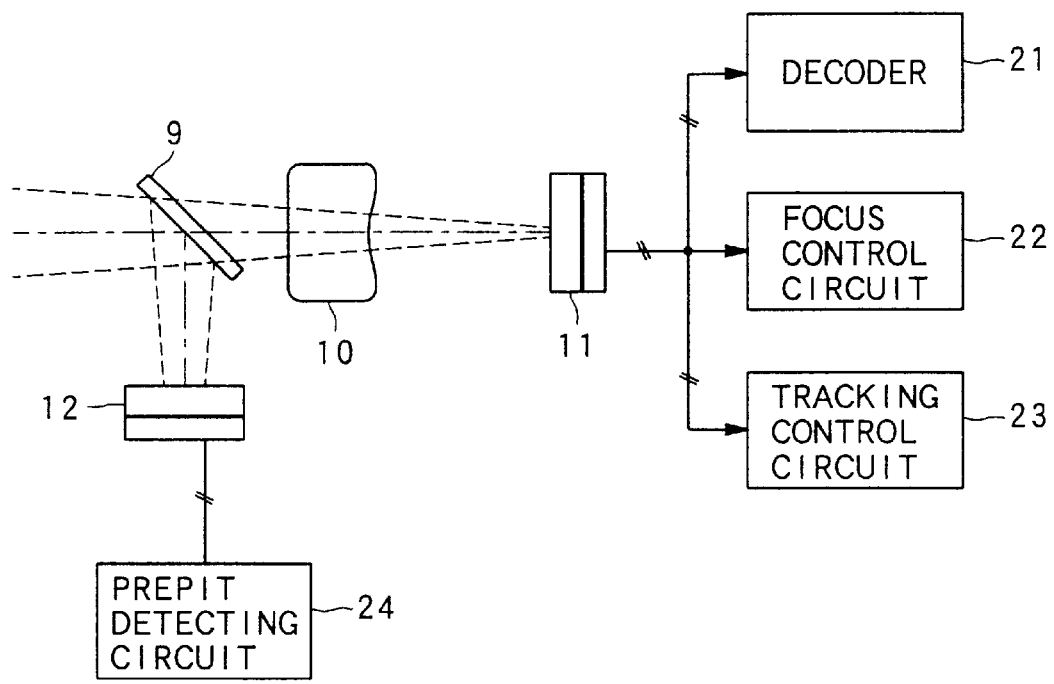
FIG. 1C and FIG. 1D are diagrams each showing a decoder, a focus control circuit, a tracking control circuit and a prepit detecting circuit connecting with the optical pickup.

As shown in FIG. 1C, the first photo receiver 11 outputs a detection signal proportional to the amount of the light beams passing through the half mirror 9. The detection signal is fed into a decoder 21, a focus control circuit 22, and a tracking control circuit 23. On the basis of this detection signal, the decoder 21 decodes recording information recorded on the optical disk 13 in order to reproduce the recording information. The focus control circuit 22 carries out focus error detection on the basis of the detection signal. The focus error detection is carried out according to astigmatic method using astigmatism produced by the multilens 10. The tracking control circuit 23 carries out the tracking error detection on the basis of the detection signal. The tracking error detection is carried out according to 3-beam method using two auxiliary beams generated by the grating 3.

On the other hand, the second photo receiver 12 outputs a detection signal proportional to the amount of light beam reflected by the half mirror 9. This detection signal is fed into the prepit detecting circuit 24, as shown in FIG. 1C. The prepit detecting circuit 24 detects the prepits according to this detection signal in order to extract address information and other control information.

In the above structure, reflectivity of the half mirror 9 needs to be determined appropriately depending on S/N ratio and the like necessary for the first photo receiver 11 and second photo receiver 12. For example a half mirror 9 having a reflectivity of about 50% can be used.

Figure 2:
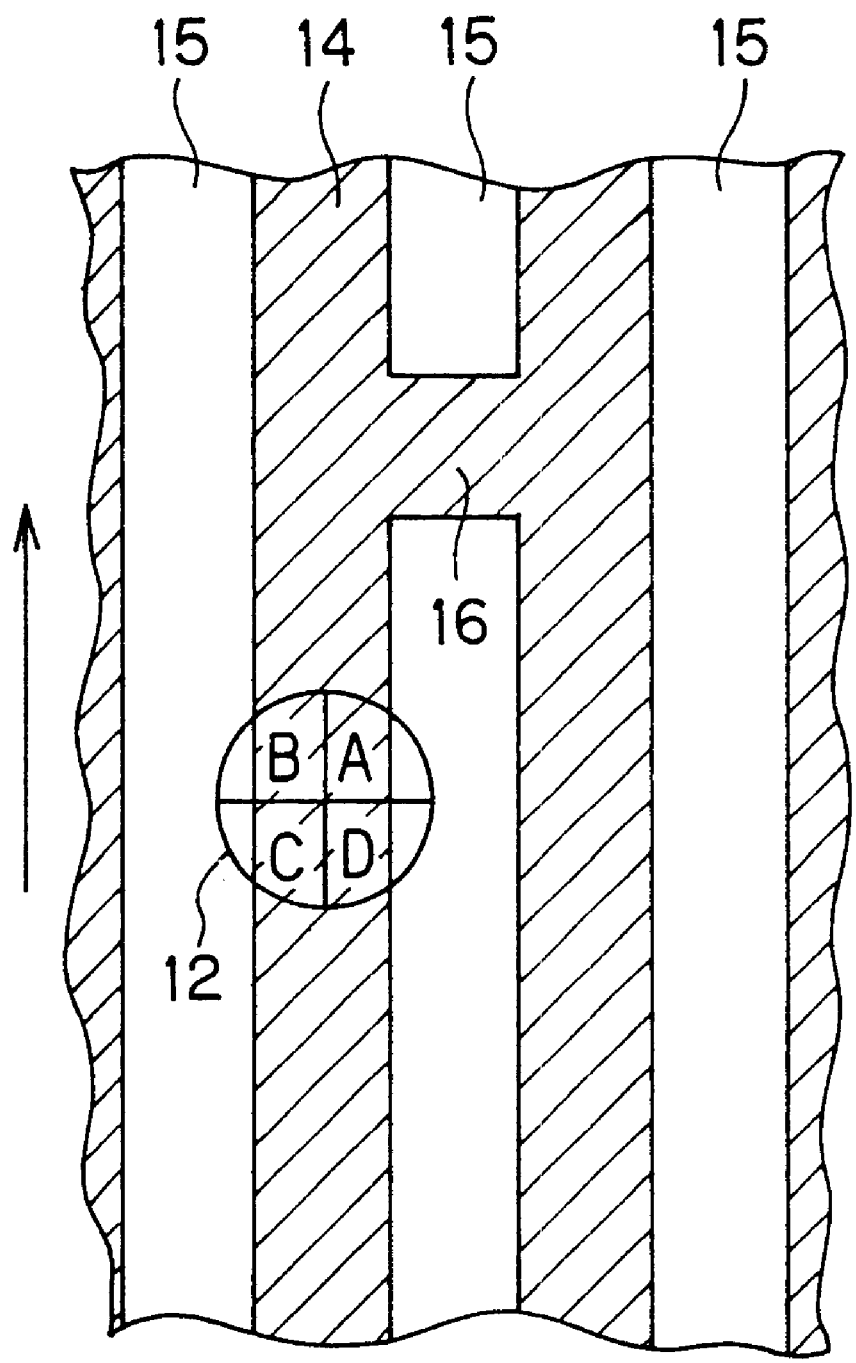
FIG. 2 is a diagram for explaining a relation between a prepit of the optical disk and light receiving pattern according to the embodiment of the present invention.

FIG. 2 shows a part of the information recording surface of the optical disk 13. As shown in FIG. 2, groove tracks 14 (or information tracks) and land tracks 15 (or guide tracks) are formed alternately on the optical disk 13. Information pits (not illustrated) are formed on the groove tracks 14. On the other hand, a plurality of prepits 16, one of which is illustrated, are formed on the land tracks 15. The prepits 16 represents recording address information and other control information necessary for recording operations or reproducing operations. More specifically, the groove track 14 is different from the land track 15 in height. The prepit 16 formed on the land track 15 is approximately equal to the groove track 14 in height.

In. FIG. 2, there is a light spot corresponding to the main beam on the groove track 14. For ease of understanding, light spots corresponding to the auxiliary beams are omitted. The light spot is moved on the groove track 14 in the direction shown by the arrow. The light beam reflected by the information recording surface is received by the second photo receiver 12 having four divided regions A, B, C and D. For ease of understanding, the four divided regions A, B, C and D are superimposed on the light spot. When the light spot is moved along the groove track 14 and reaches the position near the prepit 16, the prepit 16 is partly irradiated with the light beam (i.e., a part of the light spot is placed on a part of the prepit 16). At this time, the light receiving pattern formed on the four divided regions A, B, C and D is varied. The second photo receiver 12 detects the prepit 16 on the basis of this light receiving pattern. More specifically, the second photo receiver 12 generates four detection signals. The four detection signals correspond to the four divided regions A, B, C and D, respectively. Each detection signal contains information representing a part of the light receiving pattern formed on the corresponding regions. The four detection signals are fed into the prepit detecting circuit 24 shown in FIG. 4. The final detection signal is generated by the prepit detecting circuit 24, as described later.

Figure 3:
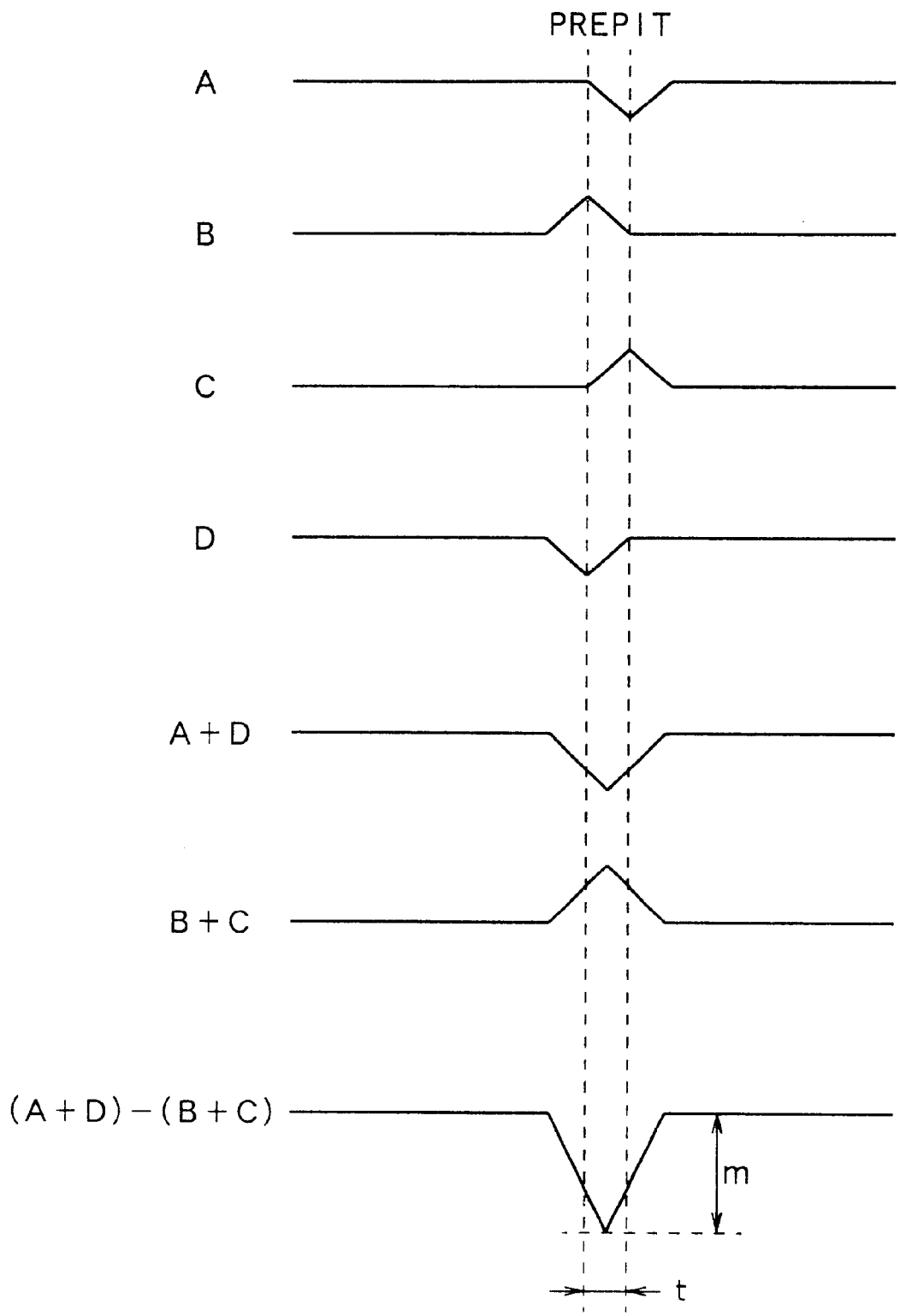
FIG. 3 is a diagram showing a pattern of the prepit detection signal according to the embodiment of the present invention.

FIG. 3 shows the aforementioned four detection signals corresponding to the divided regions A, B, C and D of the second photo receiver 12, two intermediate signals (A+D), (B+C), and the final detection signal (A+D)−(B+C). In FIG. 3, the time period t indicates the time period during which the prepit 16 is detected.

In FIG. 3, when the prepit 16 is detected, the detection signals of the division regions B and D in which a phase difference occurs interlockingly with forward of a relative advancement direction of the optical beam are changed first. Then, those of the division regions A, C in which the phase difference occurs interlockingly with backward of the relative advancement direction of the optical beam are changed. At this time, with respect to the detection signals of the division regions B, D, the detection signals of the subsequent division regions A, C are changed late by a delay time t.

At this time, due to the refraction characteristic generated in the prepit 16, in the division regions A, D, the detection signals are changed so that the intensity of the optical beam is weakened. In the division regions B, C, the detection signals are changed so that the intensity of the optical beam is intensified. Thus, the detection signals corresponding to the respective divided regions A–D following the wave shape pattern shown in FIG. 3 can be obtained.

According to the optical pickup of this embodiment, the light beams are divided to two directions before the light beam passes through the multilens 10, and one set of light beams is introduced to the second photo receiver 12. This means one set of light beams is directly entered to the second photo receiver 12 without passing through the multilens 10. That is to say, the light beams in which astigmatism is not produced by the multilens 10 are supplied to the second photo receiver 12. The second photo receiver 12 carries out the detection of the prepits by using the light beams in which astigmatism is not produced by the multilens 10. Therefore, according to the embodiment of the present invention, it can be prevented to occur deflection in the light receiving pattern caused by producing the astigmatism by the multilens 10. Accordingly, the accuracy of the prepit detection can be increased.

In a conventional optical pickup, the prepit detection is carried out on light beams after passing through the multilens. Therefore, there is astigmatism in light beam received by a photo receiver. As a result, a disturbance is generated in the light receiving pattern of the photo receiver so that the prepit detecting performance is deteriorated. Further, if there is astigmatism in an optical system, the amount of wavefront aberration of the light beam is changed depending on the direction, and therefore, a distortion occurs in a beam spot. Because the multilens is so structured as to be capable of providing light beam with astigmatism in order to carry out focus error detection according to the astigmatic method, astigmatism caused in the light beam is further increased in a structure in which the photo receiver is disposed after it passes through the multilens. Then, if astigmatism resulting from the optical system and astigmatism applied by the multilens are synthesized, oblique astigmatism is generated. Then, a light receiving pattern of the photo receiver is unbalanced or rotated, so that the deterioration of the prepit detecting performance is further intensified. Such a problem can be solved by the optical pickup of the embodiment of the present invention as stated above.

The optical pickup of the embodiment of the present invention provides another advantage. As the second photo receiver 12 is used for only prepit detection, the beam diameter of the optical beam in the second photo receiver 12 can be adjusted relatively freely. For example, if the beam diameter of the receiving light of the second photo receiver 12 is increased by about 1 mm, the optical axis reliability can be improved, so that a stability against axis deflection is secured. On the other hand, if the beam diameter of the receiving light is reduced by placing a lens or the like on an impinging side to the second photo receiver 12, the allowance of axis deflection is reduced, but an area of a light receiving surface of the second photo receiver 12 can be reduced.

Further, although, according to this embodiment, two auxiliary beams are generated in addition to the main beam to carry out tracking error detection according to three-beam method, these auxiliary beams are not required for prepit detection, and therefore it is not needed to supply the auxiliary beams to the second photo receiver 12. Therefore, it is permissible to apply a structure having a pin hole in which only the main beam is allowed into the second photo receiver 12 while the two auxiliary beams are intercepted. Further, it is permissible to apply a resin mold to the second photo receiver 12 so that only the main beam is irradiated. As a result, because two auxiliary beams properly unrelated to the prepit detection are irradiated to the second photo receiver 12, the deterioration of the prepit detecting performance can be prevented.

Figure 4:
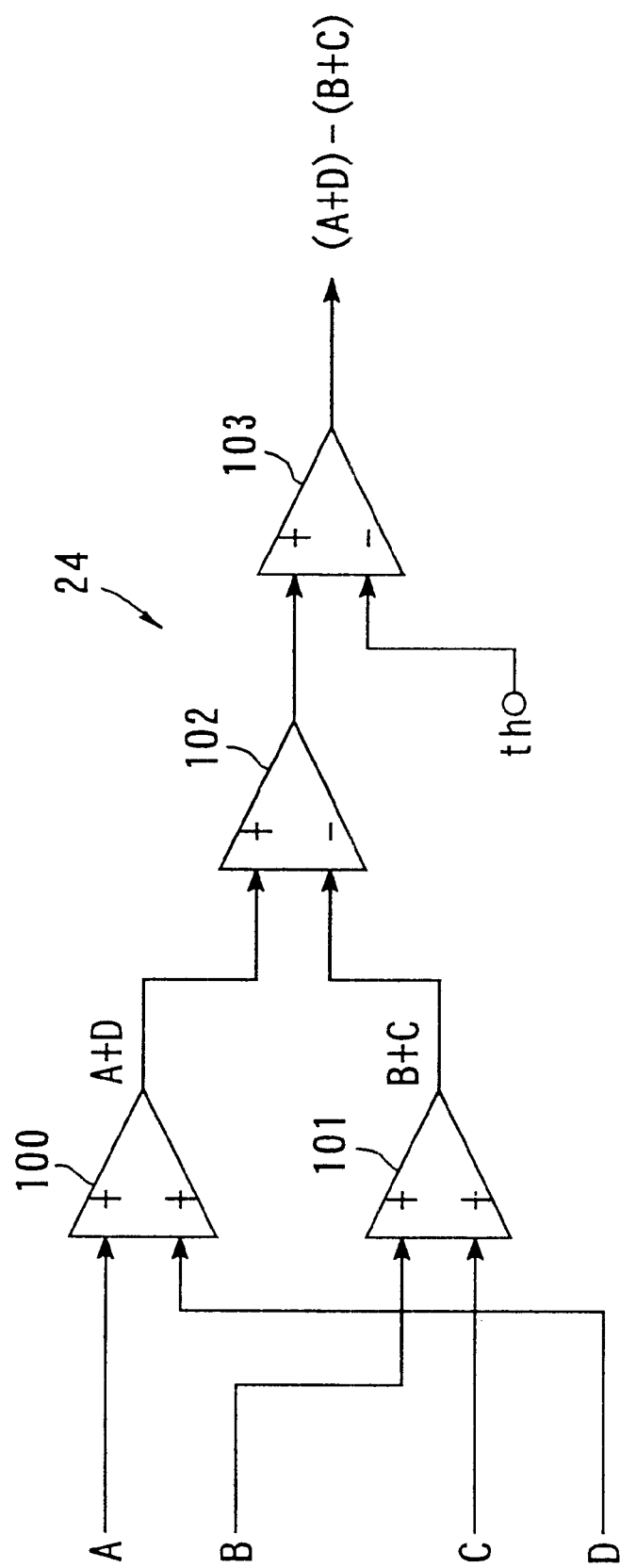
FIG. 4 is a block diagram showing a structure of the prepit detecting circuit according to the embodiment of the present invention.

FIG. 4 shows the prepit detecting circuit according to this embodiment. As shown in FIG. 4, a prepit detecting circuit comprises adders 100, 101, a subtractor 102 and a comparator 103. In FIG. 4, detection signals corresponding to reflection lights received by the respective divided regions A–D of the 4-division type second photo receiver 12 are indicated by A–D.

In the prepit detecting circuit shown in FIG. 4, the detection signals A and D are input to the adder 100. In the adder 100, the detection signals A and D are summed so as to output an addition signal corresponding to A+D. As a result, the addition signal changes according to a pattern shown in FIG. 3, thereby obtaining a waveform pattern in which a change corresponding to the prepit 16 appears.

Referring to FIG. 4, the detection signals B and C are input to the adder 101. In the adder 101, the detection signals B and C are summed up, so that an addition signal corresponding to B+C is output. As a result, the addition signal B+C changes according to a pattern shown in FIG. 3. In this case, a waveform pattern in which a change corresponding to the prepit 16 appears can be obtained.

Next, the addition signal A+D and addition signal B+C are input to the subtractor 102. This subtractor 102 obtains a differential between the addition signal A+D and addition signal B+C so as to output the final detection signal (A+D)−(B+C). Because at this time, the addition signals A+D and B+C are the same in the direction of change, a waveform pattern in which a change accompanied by detection of the prepit 16 is stressed is obtained as shown in FIG. 3.

The comparator 103 compares the final detection signal (A+D)−(B+C) with a preliminarily set threshold th so as to determine whether or not the prepit 16 exists. That is, when the final detection signal (A+D)−(B+C) is smaller than the threshold set appropriately within a margin m shown in FIG. 3, the prepit 16 is detected.

The prepit detecting circuit shown in FIG. 4 computes (A+D)−B+C) according to detection signals of the respective divided regions A–D of the second photo receiver 12 so as to obtain the final detection signal. Additionally, it is permissible to obtain the final detection signal by computing (A−C)+(D−B) using two subtractors and an adder. In this case, because the directions of changes accompanied by detection of the prepit agree with each other, it is also possible to detect the prepit 16.

Although, previously, a case in which the second photo receiver 12 is 4-division type for detecting the prepit has been described, the present invention is not restricted to this example, but it is permissible that the second photo receiver 12 is divided radially to two sections so as to detect the prepit by push-pull output.

Alternatively, it is also permissible to construct a prepit detecting circuit capable of obtaining a detection signal through a delay line or the like set to a delay time t with respect to the division regions B, D which change first so as to correct the relative delay time t of a detection signal corresponding to the respective divided regions A–D of the aforementioned second photo receiver 12. In this case, because detection peak coincides with each other in each of the division regions A–D, a further wide margin can be secured.

According to the optical pickup of the embodiment of the present invention, as described above, the light beam is divided by the half mirror 9 before passing through the multilens 10 and then introduced to the second photo receiver 12 for carrying out the prepit detection. Therefore, because the light receiving pattern of the second photo receiver 12 is capable of suppressing a disturbance of distribution of astigmatism sufficiently, a high precision detecting performance for the prepits can be secured. Further, the freedom of the adjustment of a beam diameter on a light receiving surface of the second photo receiver 12 can be raised and it is possible to remove the auxiliary beams for tracking error detection easily by devising the structure of the second photo receiver 12. On the other hand, because reproduction of ordinary recorded information, detection of tracking error, detection of focus error and the like are carried out by the first photo receiver 11 through the multilens 10, an excellent reproduction quality can be maintained.

Figure 1D:
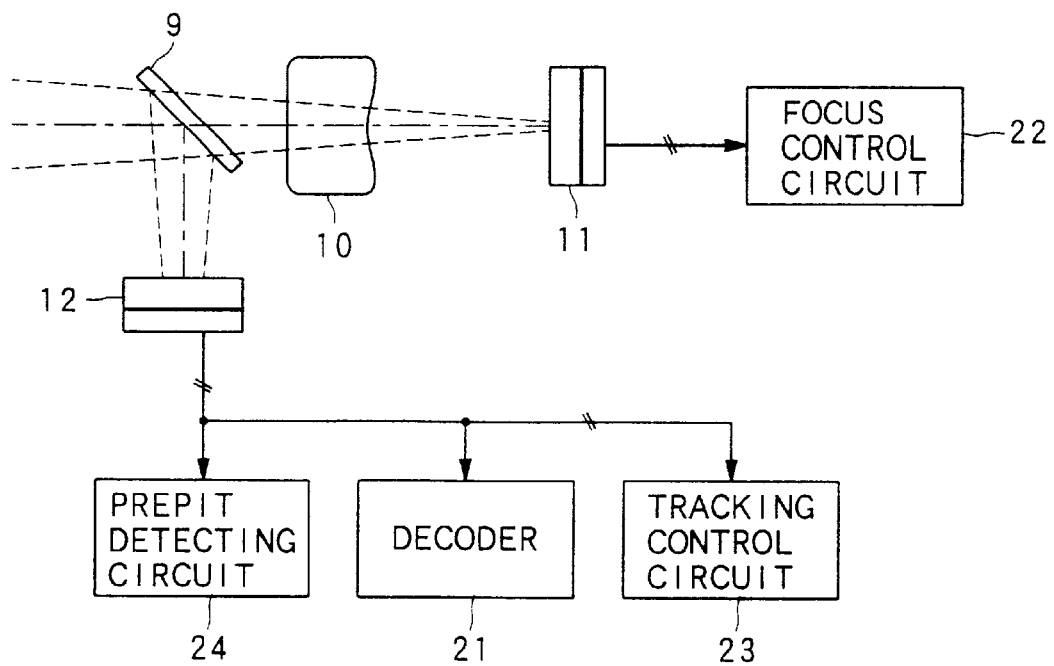

Although, according to the above embodiment, a case in which decoding of recorded information, detection of a focus error and detection of a tracking error are carried out based on the detection signal output from the first photo receiver 11 and detection of prepits is carried out based on the detection signal output from the second photo receiver 12 has been described, it is permissible to so construct that only focus error detection is carried out based on the detection signal output from the first photo receiver 11 and prepit detection, decoding of the recorded information and detection of the tracking error are carried out based on the detection signal output from the second photo receiver 12, as shown in FIG. 1D. This is because astigmatism to be applied to the light beam by the multilens 10 is necessary for detection of the focus error based on the astigmatic method, it is not always necessary for decoding of other recorded information and tracking error. In this structure, reflectivity of the half mirror 9 may be about 80%. That is, a ratio of the light amount between the first photo receiver 11 and second photo receiver 12 may be about 1:4. This is because the focus error detection can be carried out without increasing the light amount of light beam so much. As a result, a sufficiently large light amount of the light beam can be obtained at the second photo receiver 12 and therefore, this is an effective structure in case where the S/N ratio is high.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-191222 filed on Jul. 7, 1998 including the specification, claims, drawings and summary is incorporated herein by reference in its entirety.

What is claimed is:

1. A device for reading information from a recording medium having a plurality of prepits, the device comprising:
   a light emitting device for emitting a light beam to the recording medium;
   a first dividing device for dividing the light beam reflected by the recording medium into a first divided beam and a second divided beam;
   an astigmatism producing device for producing astigmatism in the first divided beam;
   a first light receiving device for receiving the first divided beam from the astigmatism producing device;
   a second light receiving device for receiving the second divided beam from the first dividing device;
   a first detecting device for carrying out a focus error detection on the basis of the first divided beam received by the first light receiving device; and
   a second detecting device for detecting the plurality of prepits on the basis of the second divided beam received by the second light receiving device.

2. The device according to claim 1 further comprising a third detecting device for carrying out a tracking error detection on the basis of the first divided beam received by the first light receiving device.

3. The device according to claim 1 further comprising a third detecting device for carrying out a tracking error detection on the basis of the second divided beam received by the second light receiving device.

4. The device according to claim 1 further comprising a decoding device for decoding the information recorded on the recording medium on the basis of the first divided beam received by the first light receiving device, in order to reproduce the information.

5. The device according to claim 1 further comprising a decoding device for decoding the information recorded on the recording medium on the basis of the second divided beam received by the second light receiving device, in order to reproduce the information.

6. The device according to claim 1, wherein the first dividing device comprises a half mirror.

7. The device according to claim 1, wherein the first dividing device comprises a non-polarization beam splitter.

8. The device according to claim 1, wherein the first detecting device carries out the focus error detection by an astigmatic method.

9. The device according to claim 1 further comprising:
   a second dividing device for dividing the light beam received from the light emitting device into a main beam and two auxiliary beams before the light beam reaches the recording medium,
   wherein the first dividing device supplies the main beam reflected by the recording medium and the two auxiliary beams reflected by the recording medium to the first light receiving device, and supplies only the main beam reflected by the recording medium to the second light receiving device.

10. The device according to claim 1, wherein:
   the recording medium includes a first track for recording the information and a second track for guiding the light beam, and
   each of the plurality of prepits is formed on the second track.

* * * * *